United States Patent [19]
Gruber et al.

[11] 3,755,222
[45] Aug. 28, 1973

[54] DENSE POLYURETHANE COMPOUNDS WHICH CONTAIN ZEOLITE HAVING A PORE SIZE OF 3 A

[75] Inventors: Hermann Gruber; Horst Weber, both of Leverkusen, Germany

[73] Assignee: Bayer Aktiengesellschaft, Leverkusen, Germany

[22] Filed: Aug. 15, 1972

[21] Appl. No.: 280,920

Related U.S. Application Data

[63] Continuation-in-part of Ser. No. 41,651, May 28, 1970, abandoned.

[30] Foreign Application Priority Data

June 3, 1969 Germany.................. P 19 28 129.9

[52] U.S. Cl. ...... 260/18 TN, 117/161 KP, 117/167, 260/37 N, 260/75 TN, 260/77.5 AP, 260/DIG. 33
[51] Int. Cl................................. C08g 51/04
[58] Field of Search ................ 260/18 TN, 37 N, 260/DIG. 33, 75 TN, 77.5 AP, 77.5 AM, 75 NB, 77.5 AB; 23/111; 252/455 Z; 117/161 KP, 167

[56] References Cited
UNITED STATES PATENTS 3,446,645 5/1969 Drost ................................. 252/455
3,505,275 4/1970 Sato et al............................. 260/18

FOREIGN PATENTS OR APPLICATIONS 251,194 2/1963 Australia............................. 260/2.5
665,361 6/1963 Canada......................... 260/DIG. 33
1,143,634 2/1963 Germany.................... 260/DIG. 33

Primary Examiner—Donald E. Czaja
Assistant Examiner—Eugene C. Rzucidlo
Attorney—Gene Harsh et al.

[57] ABSTRACT

A process is provided for the production of non-cellular polyurethane resins wherein an organic polyisocyanate is reacted with a compound containing at least two hydrogen atoms reactive with NCO groups in the presence of a dehydrated zeolite of the sodium potassium aluminosilicate type having an average molar composition of about (0.05 to 0.40) $Na_2O$ . (0.50 to 0.95) $K_2O$ . $Al_2O_3$ . ($1.9\pm0.1$) $SiO_2$ with a molar ($Na_2O + K_2O$) / $Al_2O_3$ ratio of about ($0.9\pm0.1$):1, a crystalline structure identifiable by the most intense X-ray interferences at $d = $ 12.3, 8.7, 7.1, 5.5, 4.1, 3.7, 3.4, 3.3, 3.0, 2.9, 2.8 A. $\pm$ 0.1 A. and a pore size of about 3 A.

7 Claims, No Drawings

DENSE POLYURETHANE COMPOUNDS WHICH CONTAIN ZEOLITE HAVING A PORE SIZE OF 3 A

The present invention is a continuation-in-part of application Ser. No. 041,651, filed May 28, 1970, now abandoned, and relates to substantially non-porous polyurethane compounds produced using a special crystalline zeolite.

It is possible to produce solvent-free coatings and casting resins which are notable for their rapid hardening, high resistance to external conditions and high elasticity from the polyisocyanate and polyalcohol raw materials of polyurethane chemistry. The quality of the polyurethane product produced is significantly controlled by the water content of the polyalcohols, fillers, pigments and so on used in their preparation since moisture is capable of reacting with isocyanate groups to form carbon dioxide which manifests itself as bubbles that ultimately form cells that permeate the polyurethane resin. Such a side reaction is highly advantageous when foam resin products are desired but equally disadvantageous and even harmful when solvent-free polyurethane coatings and casting resins are being prepared because the mechanical properties of cellular polymers do not meet the required standards and the foamed products swell up out of their molds. Moreover, the surface quality of a non-porous structure must be smooth, free from pores and unmarred by bubbles in order to satisfy the very stringent requirements therefore, particularly in the case of coatings which are applied in thicknesses of 1 to 2 mm.

In order to remove moisture, additives which absorb water more readily and more completely than isocyanates, either by absorption or chemical reaction, must be introduced into the system. Processes which use reactive substances such as alkaline earth metal oxides, aluminum alcoholates or orthoformic acid esters suffer from the fact that the new products formed (hydroxides or alcohols) enter into difficulty controllable side reactions with isocyanates and impair the quality of the product. Better results are obtained when absorption agents such as dehydrated calcium sulphate, hydrated alumina which has been subjected to sudden intense heating and activated crystalline zeolites are used. Zeolites which have a pore size of 4 to 10 A. have been proven to be particularly suitable and the zeolite of the sodium aluminosilicate type having a pore size of 4 A. has been most widely used in practice.

However, several years of practical experience have proven that the prior art drying agents are not always adequate, particularly when the highly desirable corrosion protection linings for storage tanks are being produced. These polyurethane coatings are applied in relatively thin layers of about 1 to 2 mm or even less and require the use of only about 100 percent (based on the polyurethane) of filler comared to the 600 percent or more required in other coatings. The properties of such coatings are very adversely affected by the presence of too many residual pores which are mainly produced by the action of atmospheric moisture. Any increase in the partial vapor pressure of the surrounding atmosphere increases by many times the number of residual pores in such coatings so that thin polyurethane coatings of low filler content applied even at 50 per cent relative humidity are not necessarily suitable for corrosion protection. This undesirable phenomenon occurs no matter which prior art drying agents are used including aluminum oxides and the zeolites, for example, regardless of their pore size. Even a sodium aluminosilicate type zeolite which has a Philippsite structure and a pore size of about 3 A. shows no improvement.

It is therefore an object of this invention to provide a method for producing non-cellular polyurethane resins which is devoid of the foregoing disadvantages.

Another object of this invention is to provide a method for producing non-porous polyurethanes which harden rapidly, have a high resistance to external conditions and high elasticity.

Still another object of this invention is to provide a method for preparing non-porous polyurethanes which are pore and bubble free, which do not swell and which have excellent mechanical properties.

Yet another object of this invention is to provide a process for preparing non-porous polyurethanes which have smooth, pore free surfaces unmarred by bubbles even in the case of coatings which are applied in very thin layers.

A further object of this invention is to provide a process for preparing non-porous polyurethanes using an additive which does not react to form side reaction products which themselves enter into reaction with the components of the polyurethane formulation.

A still further object of this invention is to provide polyurethane coatings having a low filler content which can be applied in thin layers and which are substantially free from residual pores even when applied at a relatively high humidity.

Yet a further object of this invention is to provide polyurethane coatings which can be used to protect a substrate from corrosion.

An additional object of this invention is to provide polyurethane coatings which have smooth, glossy surfaces and improved resistance to hydrolysis.

Still an additional object of this invention is to provide nonporous polyurethanes which are acid, alkaline, oil and corrosion resistant and which may be used as coatings on any substrate, as casting resins, as adhesives compounds, as elastomers, as grouting compositions, as acid and alkaline resistant mortar and the like.

The foregoing objects and other which will become apparent from the following description are accomplished in accordance with this invention, generally speaking, by providing a non-porous polyurethane resin prepared by reacting an organic polyisocyanate with a compound containing at least two hydrogen atoms reactive with NCO groups in the presence of a dehydrated zeolite of the sodium potassium aluminosilicate type having an average molar composition of about (0.05 to 0.40) $Na_2O$. (0.50 to 0.95) $K_2O$. $Al_2O_3$. (1.9 ± 0.1) $SiO_2$ with a molar ($Na_2O + K_2$)/$Al_2O_3$ ratio of about (0.9 ± 0.1):1, a crystalline structure identifiable by the most intense X-ray interferences at $d =$ 12.3, 8.7, 7.1, 5.5, 4.1, 3.7, 3.4, 3.3, 3.0, 2.9, 2.8 A. ± 0.1 A. and a pore size of about 3 A. While any desired amount of the zeolite of this invention may be employed, the polyurethane should contain from about 0.5 percent to about 25 percent by weight hased on the weight of the polyurethane and preferably from about 1 percent to about 10 percent by weight.

It was surprising to find that a dehydrated zeolite of the sodium potassium aluminosilicate type which has an average molar composition of (0.05 to 0.40) $Na_2O$.(0.50 to 0.95) $K_2O$. $Al_2O_3$.(1.9 − 0.1) $SiO_2$, a molar ($Na_2O + K_2O$)/$Al_2O_3$ ratio of about (0.9 ± 0.1):1, a crystalline structure identifiable by the most intense X-ray interferences at $d$ = 12.3, 8.7, 7.1, 5.5, 4.1, 3.7, 3.4, 3.3, 3.0, 2.9, 2.8 A ± 0.1 A. and a pore size of about 3 A. provides significantly better results than any of the prior art dehydrating agents. Even thin polyurethane coatings which have a low filler content as described above have a sufficiently low residual pore content when the drying agent of this invention is used to insure sufficient corrosion protection for all practical purposes, even at high concentrations of atmospheric moisture (above 50 percent to almost 100 percent). Moreover, the coatings prepared in accordance with this invention have considerably smoother, more glossy surfaces than any which could be produced previously. In addition, the zeolites of this invention improve the resistance to hydrolysis of the products in which they are employed and particularly coatings.

This invention also relates to containers which are provided with a polyurethane coating having a layer thickness of 0.5 to 2 mm and containing from about 0.5 to about 10 per cent by weight of a sodium potassium aluminosilicate having an average molar composition of about (0.05 to 0.40) $Na_2O$. (0.50 to 0.95) $K_2O$ . $Al_2O_3$. (1.9 ± 0.1) $SiO_2$, a molar ($Na_2O$ + $K_2O$)/$Al_2O_3$ ratio of about (0.9 ± 0.1):1, a crystalline structure identifiable by the most intense X-ray interferences at $d$= 12.3, 8.7, 7.1, 5.5, 4.1, 3.7, 3.4, 3.3, 3.0, 2.9, 2.8 A ± 0.1 A. and with a pore size of about 3 A.

The zeolite of this invention can be obtained, for example, from the previously most widely used sodium zeolite which has a pore size of 4 A. and an average composition of about (0.9 ± 0.1) $Na_2O$ . $Al_2O_3$ . (1.9 ± 0.1) $SiO_2$ . $xH_2O$ using a known ion exchange reaction by treating the sodium zeolite with an aqueous solution of potassium chloride or some other potassium salt, removing the alkaline liquor from the exchanged product by filtration, washing, drying, and activating the product by heating it to temperatures of about 400° C., for example.

The sodium zeolite which is suitable for the production of the sodium potassium aluminosilicate of this invention may be prepared in known manner from aluminate and silicate solutions or by the alkaline treatment of calcined kaoline as described, for example, in German Pat. Nos. 1,038,017 and 1,103,904.

While the drying agents of this invention may be added to the polyurethane formulation together with the pigments and fillers, it has been found to be particularly advantageous to add them in the form of a paste prepared from the pasty zeolite and any of the liquid components which must be used in any case in the reaction mixture. For example, the liquid components of the reaction mixture with which the paste may be prepared include the hydroxyl-containing compounds which react with the isocyanates to form the polyurethane such as the corresponding polyethers, vegetable oils or their derivatives. Liquid substances which have a softening effect in polyurethane systems may also be used including, for example, chlorinated paraffins, phthalic acid esters, phosphoric acid esters and so on and caster oil has proven to be particularly suitable. The pastes are advantageously prepared by mixing one part by weight of the anhydrous activated zeolite with one part by weight of the liquid component in a ball mill, a dissolving machine or the like and homogenizing the mixture.

It is advantageous to use such pastes in order to preclude the damage which can easily be done to the zeolite by atmospheric moisture during storage and by pouring them into containers. Further, the effect of the zeolite is better utilized and the dispersibility of the zeolite in the polyurethane formulation is significantly improved.

After mixing has been effected, the zeolite with the absorbed water remains in the polyurethane composition and the water absorbed therein does not react with isocyanate groups to liberate carbon dioxide or form bubbles and without the undesirable liberation of any other gases from the drying agent during the drying process. The quality of zeolite used depends on the quantity of moisture to be removed. Additions of about 5 percent are normally sufficient although an excess may be used and is not harmful since the zeolite is completely inert and has no undesirable effect on the properties of polyurethane compounds.

The polyurethane formulations to be dried in accordance with this invention may be prepared using any organic polyisocyanate, organic compound containing at least two hydrogen atoms reactive with NCO groups, fillers, pigments, dyes and so on.

The following are examples of some suitable polyalcohols which may be used for producing the polyurethane resins in question: polyhydric alcohols such as ethylene glycol, diethylene glycol, butylene glycol, glycerol, hexanetriol, trimethylol propane, pentaerythritol and the like and mixtures thereof; polyethers prepared from these alcohols and ethylene oxide; polyesters containing hydroxyl groups and prepared from polyhydric alcohols or alcohol mixtures and dibasic or polybasic carboxylic acids such as maleic acid, phthalic acid, adipic acid and the like, castor oil, brominated castor oil, reaction products of castor oil with polyhydric alcohols, octadecene-9-diol-(1,12); polyethers of polyhydric alcohols and propylene oxide; polyhydroxyl compounds obtainable by alcoholysis of natural fats and oils; polythioethers such as reaction products of alkylene oxides with thiodiglycol, polyethers prepared from tetrahydrofuran and any of those active hydrogen compounds listed in U.S. Pat. No. 3,201,372 and the like and mixtures thereof.

Any suitable polyisocyanates may be used including aliphatic, hydroaromatic, aromatic and the like polyisocyanates such as, for example, those listed in U.S. Pat. No. 3,350,362 including hexamethylene diisocyanate, isocyanate-containing reaction products of hexamethylene diisocyanate and compounds containing reactive hydrogen atoms as mentioned above, tolylene diisocyanates, isocyanate-containing reaction products of tolylene diisocyanate and polyalcohols as tri- and polymerization products of tolylene diisocyanate, of hexamethylene diisocyanate or of both, a polyphenyl-polymethylene polyisocyanate obtained by the phosgenation of a reaction mixture of aniline and formaldehyde, biuret triisocyanates such as, for example, those prepared from three mols of any of the foregoing isocyanates, specifically hexamethylene diioscyanate, and one mole of water, acylisocyanates of monobasic or polybasic carboxylic acids such as, for example, from 1 mol of acetic acid and 2 mols of tolylene diisocyanate or hexamethylene diisocyanate; carbodiimides with free terminal NCO groups prepared from polyisocyanates with catalysts such as, for example, phosphine oxides, dimers, trimers and the like of any of the foregoing isocyanates which have free NCO groups, prepolymers having terminal NCO groups, hydrogenated isocyanates such as hydrogenated tolylene diisocyanates and 4,4'-diphenylmethane diisocyanate, masked isocyanates, the corresponding thioisocyanate of any of the foregoing and mixtures thereof and the like.

While the proportion of polyisocyanates to polyalcohols may vary within wide limits as recognized in the polyurethane art, it is preferred to use mixtures which have a molar ratio of NCO to OH groups of about 0.8:1 to 1.4:1. The hardness of the polyurethanes increases with increasing degree of branching.

Substantially any of the pigments and fillers conventionally used in the production of synthetic resins or lacquers may be used for pigmenting or filling the polyurethane compounds, remembering only that substances which are alkaline in reaction and soluble and catalytically active metal compounds shorten the time for working up the mixtures. Other additives may include plasticizers and resins, coal tar and tar oils, vegetable oils and solvents, thickeners, catalysts and levelling agents. Any suitable catalysts may be used including tertiary amines and organometallic compounds, particularly those suggested in U.S. Pat. Nos. 3,201,372; 2,948,928; 2,941,967; 2,948,691 and so on.

Mixing of the components for the polyurethane compounds envisaged may be carried out by customary, known processes which include the use of expedients such as kneaders, roller mills, ball mills, sand mills, high speed stirrers and the like. Application of the mixtures which have not yet undergone complete reaction may also be carried out by customary and known processes including painting, spraying, casting, rolling and the like.

The polyurethane compounds produced using the drying agents of this invention are suitable inter alia as coatings for floors, roads or bridges; for the production of acid, alkaline and oil-resistant as well as corrosion-resistant linings for containers; as casting resins in electrical engineering, as adhesive compounds; as synthetic resin compounds; as rubbery elastomers; as grouting compositions and as acid and alkaline-resistant mortar.

The invention is further illustrated but is not intended to be limited by the following examples in which all parts and percentages are by weight unless otherwise specified.

EXAMPLE 1

Solvent-free polyurethane coatings:

About 485 parts of a polyether-ester polyalcohol which has an OH content of 5.0 per cent and a viscosity of 5,100 centipoises (at 20° C.) are mixed with about 310 parts of barium sulphate as a filler, about 85 parts of titanium dioxide as a pigment and about 100 parts of a paste prepared from about 50 per cent of castor oil and about 50 per cent of a zeolite having an average molar composition of about $0.20\ Na_2O.\ 0.72\ K_2.\ Al_2O_3.\ 1.95\ SiO_2$, a molar $(Na_2O + K_2O)/Al_2O_3$ ratio of about 0.92:1, with the most important $d$-values obtained from an X-ray powder photograph (relative intensities in brackets) of about 12.33 (100); 8.70 (50); 7.12 (30); 5.52 (20); 4.10 (40); 3.72 (60); 3.42 (15); 3.29 (50); 2.99 (80); 2.90 (20); 2.76 (40) A. and having a pore size of about 3 A. For comparison purposes a second mixture is prepared which differs from the first only in that a commercial 50 percent castor oil paste which contains a sodium aluminosilicate having a pore size of 4 A. and the chemical composition $Na_2O.Al_2O_3.2SiO_2$ is used instead of the paste of the zeolite of this invention.

Both preparation are mixed with about 230 parts of polyphenyl polymethylene polyisocyanate (31 per cent NCO, 135 centipoises at 20° C.), prepared from the condensation product of aniline and formaldehyde.

The liquid mixtures are then each poured onto glass plates to a layer thickness of 0.2 mm and exposed to air at a temperature of 20° C. at a relative humidity of about 50 per cent. Both films hardened completely after 24 hours. The surface of the polyurethane film produced with the zeolite of this invention is smooth, glossy and undisturbed whereas the comparison sample possessed a surface that was full of bubbles.

Test samples measuring 120 × 10 × 20 mm are prepared to determine the resistance of the coatings to hydrolysis. After the samples are stored for 24 hours in a 10 per cent potassium hydroxide solution at about 100° C., they suffer the following weight losses:

6.2 percent in the sample containing the zeolite of this invention, 18.8 percent in the sample containing the commercial zeolite.

EXAMPLE 2

Solvent-free polyurethane resin mortar:

About 400 parts of a polyalcohol prepared by reacting trimethylol propane with propylene oxide and having an OH content of 11.5 per cent and a viscosity of 680 centipoises (at 20° C.) are mixed with about 400 parts of an hydroxyl polyether ester having an OH content of 5.0 percent and a viscosity of 5100 centipoises (at 20° C.). About 100 parts of a paste consisting of about 50 percent of castor oil and about 50 per cent of a zeolite having an average molar composition of about $0.30\ Na_2O\ .\ 0.60\ K_2O\ .\ Al_2O_3\ .\ 1.88\ SiO_2$, a molar $(Na_2O + K_2O)/Al_2O_3$ ratio of about 0.90:1, with the most important $d$-values at about 12.33 (100); 8.70 (50); 7.12 (30); 5.52 (20); 4.10 (40); 3.72 (60); 3.42 (15); 3.29 (50); 2.99 (80); 2.90 (20); 2.76 (40) A. and a pore size of about 3 A. are then added. About 7,500 parts of quartz sand having a particle size of from about 0.2 to about 1 mm and about 7,500 parts of sand having a particle size of from about 0.8 to about 1.2 mm are then introduced. This mixture is then homogenized and about 560 parts of polyphenyl polymethylene polyisocyanate having an NCO content of 31 per cent and a viscosity of 135 centipoises (at 20° C.) are then thoroughly mixed into this preparation. The polyurethane mortar formed is suitable for use for about 1 hour within which period it could, for example, be drawn out into a layer of about 10 mm in thickness. Hardening takes place within about 24 hours. According to DIN 1164 test samples (size 40 × 40 × 160 mm) were prepared. Tests show that the hardened mortar is homogeneous and free from bubbles. In the breakage test, the fracture occurs within the quartz grain. The following test results were obtained:

Compressive strength according to DIN 1164 — 880 kg wt/cm²

Tensile strength under bending according to DIN 1164 — 390 kg wt/cm²

EXAMPLE 3

Polyurethane floor coating compounds:

About 120 parts of castor oil having an OH content of 4.8 per cent are mixed with about 170 parts of a polyether prepared by reacting trimethylol propane with propylene oxide and having an hydroxyl content of 11.5 per cent, and then with about 40 parts of titanium dioxide, about 50 parts of chromium oxide, about 515 parts of quartz sand having a particle size distribution of from about 0.05 to about 0.20 mm and about 50 parts of a zeolite having an average molar composition of about $0.12\ Na_2O\ .\ 0.81\ K_2O\ .\ Al_2O_3\ .\ 1.93\ SiO_2$, a molar $(Na_2O + K_2O)/Al_2O_3$ ratio of about 0.93:1, with the most important $d$-values at about 12.33 (100); 8.70 (50); 7.12 (30); 5.52 (20); 4.10 (40); 3.72 (60); 3.42(15); 3.29 (50); 2.99 (80); 2.90 (20); 2.76 (40) A. and a pore size of about 3 A. After the components are mixed homogeneously, the mixture is left for about 24 hours to enable the air which had been stirred into it to escape. About 230 parts of a polyphenyl polymethylene polyisocyanate having an NCO content of 31 per cent and a viscosity of 135 centipoises (at 20° C.) are then added. After being thoroughly mixed, the composition is poured out onto the floor and distributed to form a layer about 2 mm thick. The pot life is about 50 minutes. After about 24 hours, the coating is examined. The surface is hard, smooth, glossy and undisturbed.

EXAMPLE 4

Polyurethane grouting compound:

About 10 parts of triethylene glycol are homogenized with about 150 parts of trichloroethyl phosphate, about 80 parts of titanium dioxide, about 300 parts of calcium carbonate, about 25 parts of hydrogenated castor oil, about 5 parts of dibutyl tin dilaurate and about 20 parts of a zeolite having an average molar composition of about $0.20\ Na_2O\ .\ 0.72\ K_2O\ .\ Al_2O_3\ .\ 1.92\ SiO_2$, an average molar $(Na_2O + K_2O)/Al_2O_3$ ratio of about 0.92:1, with the most important $d$-values at about 12.33 (100); 8.70 (50); 7.12 (30); 5.52 (20); 4.10 (40); 3.72 (60); 3.42 (15); 3.29 (50); 2.99 (80); 2.90 (20); 2.76 (40) A. and a pore size of about 3 A. A paste is obtained which is used as component I of the two-component grouting compound. Component II which is added to component I in an amount of about 150 parts before use consists of an isocyanate-containing prepolymer obtained by reacting tolylene-2,4-diisocyanate and polypropylene glycol ether with an OH content of 1.3 percent. The prepolymer has an NCO content of 2.0 percent and a viscosity of 9,500 centipoises (at 20° C.). The pot life of the finished two-component grouting composition which can be applied, for example, with a cartridge gun, is about 2.5 hours. The composition is tested after about 48 hours. It is homogeneous, free from bubbles and, when examined in the form of an elongated test sample having a cross-section of 10 × 15 mm, it is found to have the following mechanical properties:

Elongation at break according to DIN 53 504 — 520 percent

Shore hardness at 23° C. — 18

Tensile strength according to DIN 53 504 — 6.2 kg wt/cm$^2$

Tensile stress at 100 per cent elongation — 3.2 kg wt/cm$^2$

The zeolite having the composition set forth above at page 10, lines 13 to 18 was prepared as follows: 1,500 kg of metakaolin ($Al_2O_3$ . $2SiO_2$) are suspended with 5,000 l. of water and 1,500 l. of sodium hydroxide (45%). This dispersion is heated to 95° to 100° C. under stirring and maintained at this temperature for 5 hours. The resulting sodium zeolite is washed with water and suspended again with water (4500l). This dispersion is mixed with 1,500 kg of potassium chloride, heated for 5 hours at 65° C. The resulting product of the approximate composition $0.7\ K_2O.0.2\ Na_2O.\ Al_2O_3.1.95\ SiO_2$ is washed, dried and activated by heating to 400° C. for 1 hour.

In the field of polyurethane casting resins and polyurethane coatings the "drifting"-effect is well-known and of considerable importance. "Drifting" means the shortening of that time during which the ready made polyurethane mass (i.e., after mixing the starting components) is workable. This time becomes shorter and shorter depending on the storage time of the starting components. That time during which the mixed polyurethane mass is still workable is known as "pot-life" and should be for such polyurethane masses at least 30–40 minutes. In order to avoid the "drifting" which may be caused, e. g., by the use of the common zeolite 4A, hitherto acid exchange resins had to be added to the coating or casting resin materials. However, this means an additional process step that can be saved if a zeolite as described in the present application is used, because such zeolites do not influence the original "pot-life" to a considerable extent. This effect may be illustrated by the following test results:

TABLE

| Component A | Parts | Parts |
|---|---|---|
| Polyalcohol with 11.5% OH (prepared from propyleneoxide and trimethylol propane) | 50 | 50 |
| Castor oil | 50 | 50 |
| Zeolite 4 A of Example 1 (50 % in castor oil) | 20 | |
| Zeolite 3A of Example 1 (50 % in castor oil) | | 20 |
| Component B | | |
| Polyphenylpolymethylisocyanate of Example 2 | 75 | 75 |
| | minutes | minutes |
| "pot-life" immediately after mixing of the components | 37 | 43 |
| "pot-life" after a storage time of 1 week | 27 | 43 |
| "pot-life" after a storage time of 3 weeks | 22.5 | 41 |
| "pot-life" after a storage time of 6 weeks | 22.5 | 41 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. In a process for the production of a non-porous polyurethane by reacting a compound containing at least two hyrogen atoms reactive with NCO groups with an organic polyisocyanate, the improvement which comprises carrying out the reaction in the presence of a dehydrated zeolite of the sodium potassium aluminosilicate type having an average molar composition of about $(0.05\ \text{to}\ 0.40)\ Na_2O\ .\ (0.50\ \text{to}\ 0.95)\ K_2O\ .\ Al_2O_3\ .\ (1.9 \pm 0.1)\ SiO_2$ with a molar $(Na_2O + K_2O)/Al_2O_3$ ratio of about $(0.9 \pm 0.1):1$, a crystalline structure identifiable by the most intense X-ray interferences at $d = 12.3, 8.7, 7.1, 5.5, 4.1, 3.7, 3.4, 3.3, 3.0, 2.9, 2.8$ A. $\pm 0.1$ A. and a pore size of about 3 A.

2. The process of claim 1 wherein the zeolite is converted into a paste by mixing it with any of the liquid components of the polyurethane reaction mixture other than the isocyanate.

3. The process of claim 2 wherein the liquid component is castor oil.

4. A substantially non-porous polyurethane containing sodium potassium aluminosilicate having an average molar composition of about (0.05 to 0.40) $Na_2O$ . (0.50 to 0.95) $K_2O$ . $Al_2O_3$ . $(1.9 \pm 0.1)$ $SiO_2$ with a molar $(Na_2O + K_2O)/Al_2O_3$ ratio of about $(0.9 \pm 0.1):1$, a crystalline structure identifiable by the most intense X-ray interferences at $d = 12.3, 8.7, 7.1, 5.5, 4.1, 3.7, 3.4, 3.3., 3.0, 2.9, 2.8$ A. $\pm 0.1$ A. and a pore size of about 3 A.

5. The substantially non-porous polyurethane of claim 4 which contains from about 0.5 to about 25 per cent by weight of the sodium potassium aluminosilicate.

6. The substantially non-porous polyurethane of claim 5 which contains from about 1 to about 10 per cent by weight of the sodium potassium aluminosilicate.

7. A container having a polyurethane coating which contains sodium potassium aluminosilicate having an average molar composition of about (0.05 to 0.40) $Na_2O$ . (0.50 to 0.95) $K_2O$ . $Al_2O_3$ . $(1.9 \pm 0.1)$ $SiO_2$ with a molar $(Na_2O + K_2O)/Al_2O_3$ ratio of about $\pm 0.1):1$, a crystalline structure identifiable by the most intense X-ray interferences at $d = 12.3, 8.7, 7.1, 5.5, 4.1, 3.7, 3.4, 3.3, 3.0, 2.9, 2.8$ A. $\pm 0.1$ A. and a pore size of about 3 A.

* * * * *

UNITED STATES PATENT OFFICE
CERTIFICATE OF CORRECTION

Patent No. 3,755,222     Dated August 28, 1973

Inventor(s) Hermann Gruber and Horst Weber

It is certified that error appears in the above-identified patent and that said Letters Patent are hereby corrected as shown below:

Column 1, line 56, "comared" should be --compared--.

Column 2, line 53, the formula "($Na_2O + K_2$)" should be --($Na_2O + K_2O$)--; same column, line 60, "hased" should read --based--.

Column 4, line 14, "quality" should be --quantity--.

Column 5, line 57, "0.72 $K_2$" should read --0.72 $K_2O$--.

Signed and sealed this 26th day of February 1974.

(SEAL)
Attest:

EDWARD M. FLETCHER, JR.
Attesting Officer

C. MARSHALL DANN
Commissioner of Patents